Aug. 14, 1934. W. E. HOKE 1,969,796
SEPARABLE FASTENER AND INSTALLATION THEREOF
Original Filed April 8, 1932
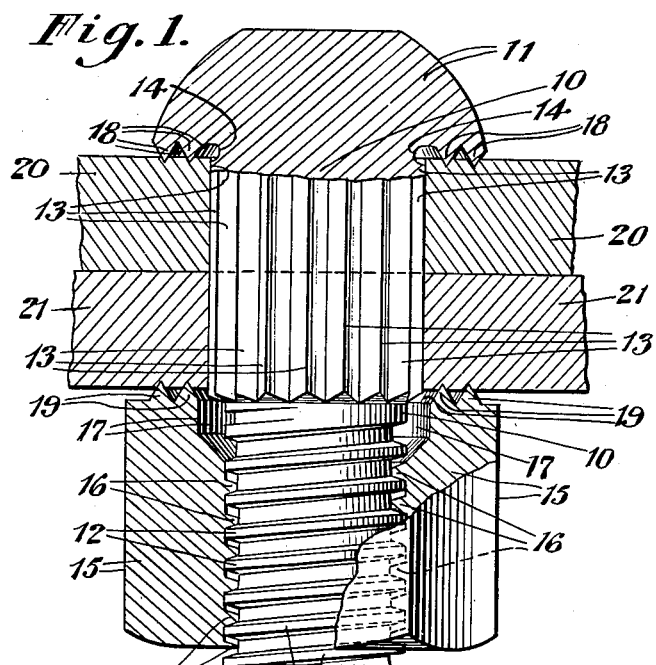
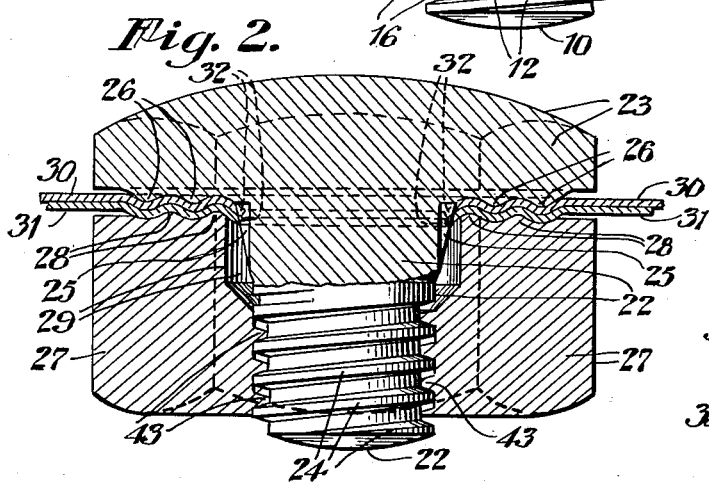
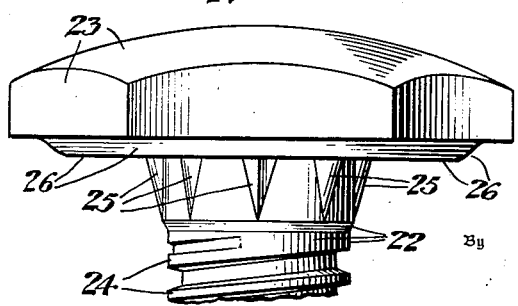
Inventor
WILLIAM E. HOKE
Attorneys Patented Aug. 14, 1934

1,969,796

UNITED STATES PATENT OFFICE 1,969,796

SEPARABLE FASTENER AND INSTALLATION THEREOF

William E. Hoke, Baltimore, Md., assignor to Dardelet Threadlock Corporation, New York, N. Y., a corporation of Delaware Original application April 8, 1932, Serial No. 603,961. Divided and this application September 16, 1932, Serial No. 633,399

8 Claims. (Cl. 85—1)

This invention relates to separable fasteners and installations or joints including such fasteners.

Important objects of the invention are to provide an improved separable fastening device having the desirable characteristics of both a bolt and a rivet; to provide an improved tight-holding releasable fastening device designed for satisfactorily joining structural steel parts and the like; and to provide an improved separable installation of the kind wherein pieces are releasably held by a separable fastener.

Other objects of the invention will appear hereinafter.

In the drawing:

Fig. 1 is a sectional view of an improved joint or installation wherein pieces are clamped together by one form of improved separable fastener;

Fig. 2 is a sectional view showing a modified form of joint including a modified form of separable fastener;

Fig. 3 is a fragmentary side elevation of the bolt member of the modified separable fastener disclosed in Fig. 2; and Fig. 4 is a fragmentary sectional view illustrating a slight modification of the joint and fastener disclosed in Figs. 2 and 3.

This application is a division of my co-pending application, Serial No. 603,961, filed April 8, 1932.

The embodiment of the invention illustrated in Fig. 1 will be first described.

The separable fastener comprises a metallic bolt and a metallic nut having coupling screw threads. The bolt has a shank 10 of round cross section headed at one end to provide a bolt head 11, screw threaded for a portion of its length at its opposite end to provide a bolt thread 12, and enlarged from the inner end of its threaded end portion substantially to the bolt head by integral longitudinally extending shank ribs 13. Preferably, as shown, ribs 13 terminate just short of the bolt head so that the enlarged ribbed or longitudinally corrugated portion of the bolt shank is joined to the bolt head by a very short unenlarged neck portion 14 of the bolt shank to provide a clearance space for receiving any rib metal which may be displaced toward the bolt head in installing the fastener.

The bore of the nut 15 is screw threaded for a portion of its length from the head of the nut to provide a nut thread 16, and is counterbored or enlarged for the remainder of its length to provide a central cylindrical non-threaded recess 17 in the base portion of the nut of sufficient diameter to adapt the non-threaded and recessed base portion of the nut thus provided for rotatively encompassing the enlarged ribbed portion of the bolt shank and the usual imperfect inner end portion of the bolt thread. As shown, the height of the recessed nut 15 substantially corresponds to the length of the threaded portion of the shank 10 of the bolt.

The ribs 13 on the bolt shank 10 are straight ribs extending directly longitudinally of the shank and are approximately V-shaped in cross section. They may either penetrate the walls of bolt holes in pieces fastened by the bolt or upset against the walls of the bolt holes according to the comparative hardness of the bolt and the joined pieces.

The work abutting face of the bolt head and the work abutting face of the recessed nut, are each provided with integral concentric annular abutment ribs which are approximately V-shaped in cross section. The peaks of the annular abutment ribs 18 on the bolt head 11 and of the annular abutment ribs 19 on the nut 15 are adapted to effect a biting engagement with an abutting joined piece, penetrate any scale or other irregularities which may be on the abutting piece, and make a secure sealed contact with the body metal of the abutting piece entirely around the bolt shank. As shown, the diameters of the annular ribs are such that their peaks engage the abutting piece outwardly beyond the crests of shank ribs 13. Thereby the bolt head and the nut are made self-calking and adapted to make a fluid tight contact with the clamped pieces around the bolt holes.

The annular ribs also enable an even or continuous contact to be obtained with the fastened pieces when the bolt is canted slightly in bolt holes which are slightly out of register. The annular ribs will penetrate the abutting piece or else upset to varying degrees around the shank to effect an even, continuous engagement with the abutting piece entirely around the bolt shank. When the annular ribs penetrate the abutting piece they also assist in holding the latter and the bolt against relative transverse slippage. While several concentric annular ribs are shown as provided on both the bolt and the nut, in some services a single such rib on both the bolt and nut may be sufficient.

In Fig. 1 the improved separable fastener just described is shown clamping metal pieces or plates 20 and 21. In installing the fastener, the bolt shank is inserted in round bolt holes in the pieces of a diameter intermediate the outside or major diameter of the threaded and enlarged non-threaded portions of the bolt shank, the enlarged ribbed portion of the shank being driven or otherwise forced into the bolt holes and extending entirely therethrough with ribs 13 interlocked with pieces 20 and 21. The nut 15 is shown screwed upon the bolt, and the pieces 20 and 21 as being tightly clamped between the nut 15 and the bolt head 11 with the annular ribs on the nut and the bolt head partly embedded in the adjacent pieces.

The threads of the bolt and nut are preferably the well known Dardelet self-locking screw threads, as shown, and these threads are shown axially interwedged into frictionally locked relation against accidental unscrewing in Fig. 1. A pair of these threads automatically interwedge against accidental unscrewing when, at any point to which they may be screwed together, the screwing up of the nut causes the coupled nut and bolt to exert a clamping effort on the pieces which are being fastened. The root of the external or bolt thread and the crest of the internal or nut thread are slightly conoidal and taper toward the bolt axis in the direction of the head of the bolt and, when the clamping effort begins, the nut thread moves across the thread groove of the bolt from the deeper to the shallower side of said thread groove to elastically interwedge or securely frictionally lock the threads together against accidental unscrewing.

In Figs. 2 and 3 a modified form of separable fastener is shown especially adapted for securing thin sheet metal pieces, or other pieces capable of being crimped or corrugated around bolt holes therein by the fastener, an installation of the modified fastener wherein it clamps thin pierced sheet metal pieces 30 and 31 being shown in Fig. 2.

The round shank 22 of the bolt in this construction is headed at one end to provide a bolt head 23, is threaded for a portion of its length at its opposite end to provide a bolt thread 24 and is enlarged from the inner end of its threaded portion to the bolt head by integral longitudinally extending ribs 25 on the shank, which ribs 25 are preferably approximately V-shaped in cross section and taper as they recede from the bolt head. The bolt shank is short, and the work piece abutting face of the bolt head is provided with integral concentric annular ribs 26 which are rounded in cross section and extend around said bolt head face outwardly beyond the crests of the shank ribs 25.

The work abutting face of the nut 27 in the modified fastener is provided with integral concentric annular ribs 28 which are rounded in cross section and are radially staggered with relation to the annular ribs 26 on the bolt head so as to interfit or nest with the latter ribs.

In this modified fastener, the height of the nut 27 substantially corresponds to the length of the short shank 22 of the bolt, and the depth of the central cylindrical non-threaded recess 29 in the base of the nut substantially corresponds to the length of the non-threaded and enlarged ribbed portion of the bolt shank. The maximum diameter of the enlarged ribbed portion of the bolt shank is slightly less than the inside diameter of the non-threaded and recessed base portion of nut 27 as in the case of the previously described fastener. The nut is screw threaded to provide a nut thread 43. The bolt and nut threads shown are Dardelet self-locking threads.

In installing the fastener, the bolt shank 22 is inserted in registering bolt holes 32 in pieces 30 and 31, which holes are just large enough to receive the threaded end of the shank, and then the enlarged ribbed portion of the shank is driven part way through the bolt holes, the protruding shank ribs 25 cutting notches in the edges of the bolt holes to hold the bolt against turning. Then the nut 27 is screwed on the bolt and tightened. The opposed ribbed abutment faces of the bolt head and the nut form annular concentric crimps or corrugations in the sheet metal pieces 30 and 31 when the nut is tightened, to thereby seal the joint entirely around the bolt shank and to interlock the fastener and pieces 30 and 31 to positively resist lateral stresses and relieve the joined pieces or sheets 30 and 31 from strain at the edges of the bolt holes.

In Fig. 4 there is shown a slight modification of the fastener and fastener installation disclosed in Figs. 2 and 3 especially intended for the joining of sheet metal pieces 33 and 34 of greater thickness than pieces 30 and 31. In this embodiment of the invention, the fastener and fastener installation are identical with those of Figs. 2 and 3 except for the relatively greater thickness of the clamped pieces 33 and 34, and the fact that the annular ribs 35 and 36 on the work abutting faces of the bolt head and nut respectively are approximately V-shaped in cross section, each of these ribs having straight converging sides meeting at the rib crest and at the bottoms of the grooves between adjacent ribs, to facilitate the crimping of the thicker pieces or sheets 33 and 34 and definitely seal the joint. The sharper crests of the annular ribs 35 and 36 form continuous concentric edges which may slightly penetrate the joined pieces and form tight sealing, continuous, line contacts therewith entirely around the bolt shank. In Fig. 4, 37 is the bolt shank, 38 one of the shank ribs, 39 the recess in the base of the nut, 40 the nut, 41 the bolt head, and 42 the registering bolt holes in pieces 33 and 34 through which the ribbed portion of the shank has been forced.

The joint structures for sheet metal parts described above are particularly well suited for joining sheets of aluminum or duralumin. The latter is extensively employed in aircraft construction, and it is very difficult to rivet owing to certain characteristics of the metal and owing also to the fact that clearance for assembling operations is often quite limited. The bolt and nut threads for the fastener elements of all of the joints shown and described are preferably Dardelet self-locking screw threads, as shown.

What I claim is:

1. A separable fastener comprising a bolt whose shank is round and has a bolt head thereon joined to a threaded end portion thereof by a non-threaded portion of the shank which is radially enlarged by longitudinal ribs, and a threaded nut screwed on the threaded end portion of the bolt shank and having a centrally recessed non-threaded base portion whose internal size is great enough for revolution thereof about the enlarged ribbed portion of the bolt shank, the work abutting faces of which bolt head and recessed base portion of the nut each have thereon one or more annular ribs whose crests are displaced farther from the axial line of the coupled bolt and nut than the crests of the ribs on the bolt shank.

2. A separable fastener as claimed in claim 1, wherein the length of the threaded end portion of the bolt shank substantially corresponds to the height of the nut.

3. A separable fastener as claimed in claim 1, wherein the height of the nut substantially corresponds to the length of the bolt shank, and the depth of the centrally recessed base portion of the nut substantially corresponds to the length of the non-threaded portion of the bolt shank.

4. A separable fastener as claimed in claim 1, wherein the annular ribs on the bolt head and nut are relatively staggered so that a bolt head rib is not directly opposed to a nut rib.

5. A separable fastener as claimed in claim 1, wherein the height of the nut substantially corresponds to the length of the bolt shank, and the annular ribs on the bolt head and nut are relatively staggered so that a bolt head rib is not directly opposed to a nut rib.

6. A separable joint comprising pierced pieces, a bolt having a longitudinally ribbed shank portion extending through the apertures in said pieces with its ribs interlocked with the pieces, the bolt shank having a head at one end of said ribbed shank portion and a threaded end portion at the opposite end of said ribbed shank portion, and a nut screwed on said threaded end portion of the shank having a central recess in its base of greater diameter than the ribbed portion of the bolt shank, the pieces being clamped between the bolt head and the nut, and said bolt head and nut each having on its work abutting face one or more annular ribs contacting and deforming the abutted piece around the piece aperture beyond the crests of the bolt shank ribs which are interlocked with the pieces.

7. A separable joint as claimed in claim 6, characterized in that the annular ribs on the bolt head and nut are not directly opposed, and the pierced pieces are annularly crimped and clamped around their apertures by the annular ribs on the bolt head and nut.

8. A two-part separable fastener for sheet metal and other thin pieces comprising, in combination, a bolt of which the shank is provided with a bolt head and is threaded from one end to a point close to the bolt head and enlarged in diameter for the remainder of its length by longitudinal splines, and a threaded nut which is screwable on and off the bolt shank, the base face of the nut and the face of the bolt head which is opposed thereto when the bolt and nut are screwed together having means for annularly crimping, outwardly beyond the crests of said splines, pieces clamped by the bolt and nut, said means comprising an annular groove in one of said faces and an annular rib on the other face, which groove and rib axially register when the bolt and nut are screwed together.

WILLIAM E. HOKE.